United States Patent
Ljung

[15] 3,691,852
[45] Sept. 19, 1972

[54] GYRO ARRANGEMENT
[72] Inventor: Bo Hans Gunnar Ljung, Canoga Park, Calif.
[73] Assignee: A G A Aktiebolag, Lidingo, Sweden
[22] Filed: Nov. 7, 1969
[21] Appl. No.: 874,804

[30] Foreign Application Priority Data
Nov. 7, 1968 Sweden ................... 15060/68

[52] U.S. Cl. ............................. 74/5, 73/1 E, 74/78
[51] Int. Cl. .......................................... G01c 19/32
[58] Field of Search ................ 116/124; 73/1 E, 514; 33/226 C; 74/78, 89.17, 5.6, 5

[56] References Cited

UNITED STATES PATENTS

| | | |
|---|---|---|
| 794,823 | 7/1905 | Voss ............................. 74/78 |
| 1,801,619 | 4/1931 | Arrea ........................ 74/5.6 X |
| 1,900,709 | 3/1933 | Henderson ................ 74/5.6 X |
| 2,569,676 | 10/1951 | Kenyon ..................... 74/5.6 X |
| 2,705,421 | 4/1955 | Arnold ......................... 73/1 E |
| 2,709,922 | 6/1955 | Knutson ...................... 74/5.6 |
| 3,481,207 | 12/1969 | Knutson ...................... 74/5.6 |

Primary Examiner—Manuel A. Antonakas
Attorney—Larson, Taylor & Hinds

[57] ABSTRACT

A gyro arrangement includes a gyro housing mounted for rotation about a first axis and an indicator device mounted for rotation about a second, parallel axis, the gyro housing and the indicator device also being mounted for rotation in common about a further axis perpendicular to the first and second axes. A pinion connected to the indicator shaft engages a rack pivoted about the free end of an arm connected to the housing shaft to provide rotation of the indicator device responsive to rotation of the gyro housing.

4 Claims, 2 Drawing Figures

PATENTED SEP 19 1972　　　　　　　　　　　3,691,852

INVENTOR
BO HANS GUNNAR LJUNG

BY  Larson and Taylor

ATTORNEYS

GYRO ARRANGEMENT

FIELD OF THE INVENTION

The present invention relates to a gyro arrangement including a gyro housing and an indicating device for indicating the position of the gyro housing relative to a predetermined reference direction.

BACKGROUND OF THE INVENTION

In a gyro arrangement of the type described above the indicator device rotates responsive to and in dependence upon the rotation of the gyro housing, the indicating device and the gyro housing being rotatable about mutually parallel axes. The indicating device and the gyro housing are also mutually rotatable about an axis perpendicular to the parallel axes discussed above, the mounting shafts forming these axes being conventionally mounted in a frame rotatable about the perpendicular axis referred to.

A number of important requirements must be fulfilled in arrangements of the type described. For example, the indicating device must precisely trace and reproduce the rotation of the gyro housing in order to produce an accurate indication of the position thereof. Further, the mechanism for transferring the rotation of the gyro housing to the indicating device should be such that no braking of the movement of the gyro housing is produced which could affect the precision and balance of the operation of the gyro housing. In addition, it is preferable that the gyro arrangement be of the type in which the gyro housing and the indicating device rotate in opposite directions such that when the arrangement is used, for example, in an airplane as a gyroscope to indicate the orientation of the horizon, a readily discernible representation of the attitude of the airplane relative to the horizon will be produced.

In accordance with a prior arrangement of this type the rotational movement of the gyro housing is transferred to the indicator device through a system utilizing bevel gears or pinions. A first pinion is located on the gyro housing shaft and a second pinion is located on the shaft of the indicator device, these pinions cooperating with a further pair of bevel pinions mounted on a shaft arranged at right angles to the housing and indicator shafts. This arrangement suffers a number of disadvantages in that the mechanism is relatively heavy and complicated and necessitates the use of pinions which must be precision machined.

SUMMARY OF THE INVENTION

In accordance with the present invention an arrangement of the type discussed hereinabove is provided which includes a mechanism for transferring the rotational movement of the gyro housing to the indicator device which is simpler yet more dependable than mechanisms conventionally utilized.

In brief, the arrangement includes a pinion connected to the shaft of the indicator device for engaging a rack pivoted about a pivot axis rotatable with the gyro housing about the axis thereof. The rack may be pivoted about a pivot pin located at the free end of an arm secured to the housing shaft. The arrangement in accordance with the present invention permits the use of a pinion which is eccentrically mounted relative to the axis of the indicator shaft as well as a pinion mounted concentrically with that axis. The former arrangement permits the use of a scale which is linear in the areas of interest whereas the latter arrangement, while requiring a non-linear scale, provides greater accuracy in the critical zero reading area of the scale.

The gyro arrangement in accordance with the invention preferably includes a roller, the rack being longitudinally displaceable between the pinion and the roller and including a curved surface which engages the roller and maintains the width of the rack between the pinion and the roller substantially equal to the spacing between the pinion and the roller dictated by the rotation of the housing shaft.

Other features and advantages of the present invention will be set forth in or obvious from the detailed description of a preferred embodiment thereof found hereinbelow.

DESCRIPTION OF THE PREFERRED EMBODIMENTS

Figure 1:
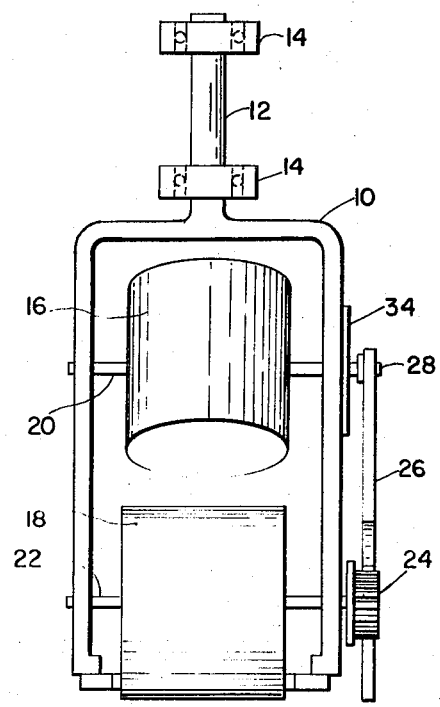
FIG. 1 is a plan view of a presently preferred embodiment of the invention.

Referring particularly to FIG. 1, a gyro arrangement incorporating the present invention includes a frame 10 which is journalled in a fixed support by means of a shaft 12 and ball bearings 14, the fixed support normally being provided by a portion of a vehicle, such as an airplane, in which the gyro arrangement is mounted. For such a mounting the shaft 12 can be assumed to be arranged coaxial with the longitudinal axis of the vehicle. Frame 10 supports a gyro housing denoted 16 and an indicator device denoted 18, housing 16 and indicating device 18 being journalled for rotation in frame 10 by means of shafts 20 and 22, respectively. As described hereinbelow, gyro housing 16 and indicating device 18 are interconnected by means of a motion transfer mechanism such that rotation of gyro housing 16 about shaft 20 produces rotation of indicating device 18 in an opposite direction about shaft 22.

Figure 2:
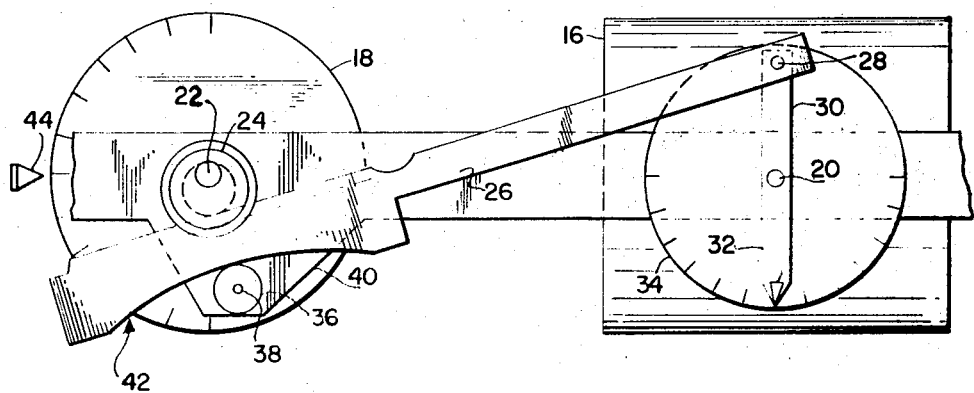
FIG. 2 is a side elevational view to an enlarged scale illustrating the mechanism for transferring movement between the gyro housing and indicator device.

As can best be seen in FIG. 2, the transfer mechanism referred above includes a pinion 24 secured to shaft 22. In the embodiment under consideration pinion 24 is mounted eccentrically relative to the axis of shaft 22 although as explained hereinafter pinion 24 can also be concentrically mounted. A rack 26 is mounted for engagement with pinion 24 the other end of the rack being pivoted about a pivot axis formed by a pivot pin 28. The pivot formed by pivot pin 28 is rotatable about shaft 20, and in the exemplary embodiment under consideration, is mounted at a free end of an arm 30 secured to shaft 20. As shown in FIG. 2, an index mark 32 is located at the other end of arm 30 and cooperates with a disc 34 affixed to frame 10 to provide an indication of the position of gyro housing 16 relative to frame 10. However, for normal operation, the position of gyro housing 16 is indicated by indicating device 18, and more specifically, by the angular position of indicating device 18 relative to a fixed index mark 44. As stated hereinabove the indicating device 18 and index mark 44 may, for example, cooperate to indicate the attitude of an aircraft relative to the horizon. For the zero position of the various elements of the gyro, shown in FIG. 2, the spin axis of the gyro is perpendicular to the plane defined by frame 10 and shaft 20.

A roller 36 is mounted on the opposite side of rack 26 from pinion 24 and serves in maintaining pinion 24 in constant engagement with rack 26. Roller 36 is rotatable about a shaft 38 mounted in a flange or bracket portion 40 of frame 10. As shown in FIG. 2, the portion of rack 26 which engages roller 38 is of a curvature, indicated at 42, such that the width of the rack between pinion 24 and roller 38 is substantially equal to the spacing between these members, as dictated by the position of rack 26 relative to pinion 24, during the entire operating cycle.

It is noted that where pinion 24 is concentric with shaft 22 rather than eccentric as shown in FIG. 2, indicating device 18 must be sinusoidally graduated. The requirement for sinusoidal graduation of the indicator scale may be appreciated from considering the fact that rotation of gyro housing 16 through a predetermined angle from the position shown in FIG. 2 results in a relatively greater rotation of indicating device 18 than a corresponding rotation of gyro housing 16 through the same predetermined angle starting from a position wherein rack 26 and arm 30 are substantially parallel. It is noted that a concentric arrangement of pinion 24 may be of advantage in some situations in that such an arrangement produces a higher sensitivity about the zero position of the gyro housing 16.

As discussed hereinabove, in the embodiment shown in FIGS. 1 and 2, pinion 24 is arranged eccentrically relative to shaft 22, the eccentricity of pinion 24 being selected to substantially compensate for the longitudinal displacement of rack 26 in accordance with a sine function. This arrangement enables the graduation of the scale of indicating device 18 to be substantially linear at least for a range of plus or minus 70° from the position of the gyro spin axis shown in FIG. 2. It is noted that this range of angular values completely covers the range of values of interest during normal flight conditions.

It will be appreciated from the foregoing that in addition to the other advantages thereof the gyro construction of the invention enables a choice of scales including a scale which is substantially linear within ±70° of the zero setting and a non-linear scale providing a very high sensitivity in the range about the zero reading position.

Although the invention has been described in detail with respect to presently preferred, exemplary embodiments thereof, it will be understood by those of ordinary skill in the art that variations and modifications may be effected within the scope and spirit of the invention.

What is claimed is:

1. In a gyro arrangement including a gyro housing, a first shaft rotatably mounting the gyro housing about a first axis, indicating means rotatably responsive to the rotation of said gyro housing, and a second shaft rotatably mounting said indicating means about a second axis parallel to said first axis, said gyro housing and said indicating means being further rotatable in common about a further axis perpendicular to said first and second axes, the improvement comprising a pinion connected to said second shaft, a rack engaging said pinion, and means, rotatable with the gyro housing about said first shaft, for pivotably mounting said rack.

2. A gyro arrangement as claimed in claim 1 further comprising means for eccentrically mounting said pinion relative to the axis of said indicating means.

3. A gyro arrangement as claimed in claim 2 further comprising a roller, said rack being longitudinally displaceable between said pin and said roller and including a curved surface for engagement with said roller for maintaining the width of the rack between said pin and said roller substantially equal to the spacing between said pin and said roller, dictated by the rotation of said first shaft, throughout a complete operating cycle.

4. A gyro arrangement as claimed in claim 1 wherein said means for pivotally mounting said rack includes an arm connected to said first shaft for rotation therewith and means for pivotably mounting said rack at a free end of said arm.

* * * * *